(12) United States Patent
Arzuaga et al.

(10) Patent No.: US 9,175,225 B2
(45) Date of Patent: Nov. 3, 2015

(54) SHIFTING MECHANISMS FOR FLUID JET DECOKING TOOLS

(75) Inventors: Daniel O. Arzuaga, Hermosa Beach, CA (US); Jagadish Janardhan, Fullerton, CA (US)

(73) Assignee: Flowserve Management Company, Irving, TX (US)

( * ) Notice: Subject to any disclaimer, the term of this patent is extended or adjusted under 35 U.S.C. 154(b) by 684 days.

(21) Appl. No.: 13/367,706

(22) Filed: Feb. 7, 2012

(65) Prior Publication Data

US 2012/0199674 A1 Aug. 9, 2012

Related U.S. Application Data (60) Provisional application No. 61/440,182, filed on Feb. 7, 2011.

(51) Int. Cl.

| | |
|---|---|
| *C10B 43/00* | (2006.01) |
| *C10B 27/04* | (2006.01) |
| *A62C 31/00* | (2006.01) |
| *C10B 33/00* | (2006.01) |
| *C10B 41/02* | (2006.01) |
| *F16K 31/04* | (2006.01) |

(52) U.S. Cl.
CPC ............... *C10B 33/006* (2013.01); *C10B 41/02* (2013.01); *F16K 31/041* (2013.01); *Y10S 239/13* (2013.01)

(58) Field of Classification Search
CPC .... C10B 33/006; B05B 1/1609; Y10S 239/13
USPC ........... 239/442, 443, 447, DIG. 13; 202/241; 137/625.11, 625.15
See application file for complete search history.

(56) References Cited

U.S. PATENT DOCUMENTS

| | | | |
|---|---|---|---|
| 4,611,613 A | 9/1986 | Kaplan | |
| 4,738,399 A * | 4/1988 | Adams | 239/447 |
| 5,794,729 A | 8/1998 | Van Meter et al. | |
| 6,644,567 B1 * | 11/2003 | Adams et al. | 239/566 |
| 7,163,165 B2 | 1/2007 | Paul et al. | |
| 7,473,337 B2 | 1/2009 | Lah | |
| 7,819,343 B2 | 10/2010 | Paul et al. | |
| 8,002,204 B2 | 8/2011 | Paul et al. | |
| 8,066,334 B2 | 11/2011 | Paul et al. | |
| 2002/0170814 A1 | 11/2002 | Lah | |
| 2007/0084714 A1 | 4/2007 | Lah | |
| 2009/0165617 A1 * | 7/2009 | Paul et al. | 83/177 |
| 2009/0165618 A1 * | 7/2009 | Paul et al. | 83/177 |

* cited by examiner

*Primary Examiner* — Len Tran
*Assistant Examiner* — Alexander Valvis
(74) *Attorney, Agent, or Firm* — Dinsmore & Shohl LLP (57) ABSTRACT

A mode shifting apparatus for a decoking tool is described herein. A diversion plate can be used to provide selective delivery of a pressurized decoking fluid to one or the other of nozzles in the tool. The mode shifting apparatus can be used to switch between a cutting mode of operation and a drilling mode of operation by rotation of the diversion plate, where a biasing force causes the diversion plate to unseat itself from an adjacent surface of the tool in order to reduce friction forces between them.

15 Claims, 5 Drawing Sheets

SHIFTING MECHANISMS FOR FLUID JET DECOKING TOOLS

CROSS-REFERENCE TO RELATED APPLICATIONS

This application claims the benefit of U.S. Provisional Application No. 61/440,182, filed Feb. 7, 2011, entitled "IMPROVED AUTOSHIFT MECHANISM FOR A FLUID JET DECOKING TOOL."

TECHNICAL FIELD

The embodiments described herein generally relate to devices for removing coke from containers such as coking drums used in oil refining, and more specifically to devices for shifting between nozzle modes in a decoking tool used in oil refining coke drums.

BACKGROUND

In conventional petroleum refining operations, crude oil is processed into gasoline, diesel fuel, kerosene, lubricants or the like. It is a common practice to recover heavy residual hydrocarbon byproducts through a thermal cracking process known as delayed coking. In a delayed coker operation, heavy hydrocarbon (oil) is pumped through furnaces wherein it is heated to a high temperature (for example, between 900° F. and 1000° F.) on its way to cylindrical vessels known as coke drums which are as large as 30 feet in diameter and 140 feet in height, and typically configured to operate in pairs. While in the coke drum, the heated oil releases its valuable hydrocarbon vapors which are then sent to distilling towers where they condensate (including, among other things, gas, naphtha and gas oils) and further processed into more useful products, leaving behind, through the combined effect of temperature and retention time, solid petroleum coke. This coke residue must be broken up in order to remove it from the vessel, and is preferably accomplished by using a decoking (or coke cutting) tool in conjunction with a decoking fluid, such as high pressure water.

Such a tool can include a number of nozzles for removing coke such as, for example, a drill bit with both drilling and cutting nozzles. The decoking tool can be lowered into the vessel through an opening in the top of the vessel, and the high pressure water supply can be introduced into the decoking tool to supply decoking fluid to the desired nozzles of the decoking tool.

Early versions of shifting between the cutting and drilling nozzles were accomplished manually. Some automatic shifting mechanisms can be shifted via the pressurization and depressurization cycle of decoking fluid. However, such automatic shifting may cause excessive wear on the decoking tool. Accordingly, a need exists for alternative mode-shifting apparatuses for use in a fluid jet decoking tool.

SUMMARY

In one embodiment, a mode-shifting apparatus for use in a fluid jet decoking tool may include a diversion plate, a control rod, a shifting mechanism, and a biasing member. The diversion plate can be configured to provide selective fluid communication between a source of pressurized decoking fluid and a first nozzle and a second nozzle. The diversion plate can define a tool-engaging surface thereon. The control rod can be coupled to the diversion plate. The shifting mechanism can be cooperative with the diversion plate through the control rod such that a change in decoking fluid pressure imparted to the shifting apparatus produces selective rotary movement in the diversion plate through the control rod. The biasing member can be responsive to changes of the decoking fluid pressure such that the biasing member is configured to temporarily unseat the tool-engaging surface of the diversion plate from an adjacent surface of a decoking tool during the change in the decoking fluid pressure. The biasing member can maintain the diversion plate and the decoking tool in a state of separation during at least a portion of a time prior to relative rotary movement.

In another embodiment, a mode-shifting apparatus for use in a fluid jet decoking tool may include a diversion plate, a control rod, a shifting mechanism, and a biasing member. The diversion plate may be configured to provide selective fluid communication between a source of pressurized decoking fluid and a first nozzle and a second nozzle. The diversion plate can define a tool-engaging surface thereon. The control rod can be coupled to the diversion plate. The control rod may include a ratcheting mechanism. The shifting mechanism may include an actuator sleeve engaged with the ratcheting mechanism of the control rod. The actuator sleeve can be engaged with an actuator pin carrier that is biased axially by a shift biasing member. A change in decoking fluid pressure imparted to the shifting apparatus can produce selective rotary movement in the diversion plate through the control rod. The biasing member can be responsive to changes of the decoking fluid pressure such that the biasing member is configured to temporarily unseat the tool-engaging surface of the diversion plate from an adjacent surface of a decoking tool during the change in the decoking fluid pressure. The biasing member can maintain the diversion plate and the decoking tool in a state of separation during at least a portion of a time prior to relative rotary movement.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
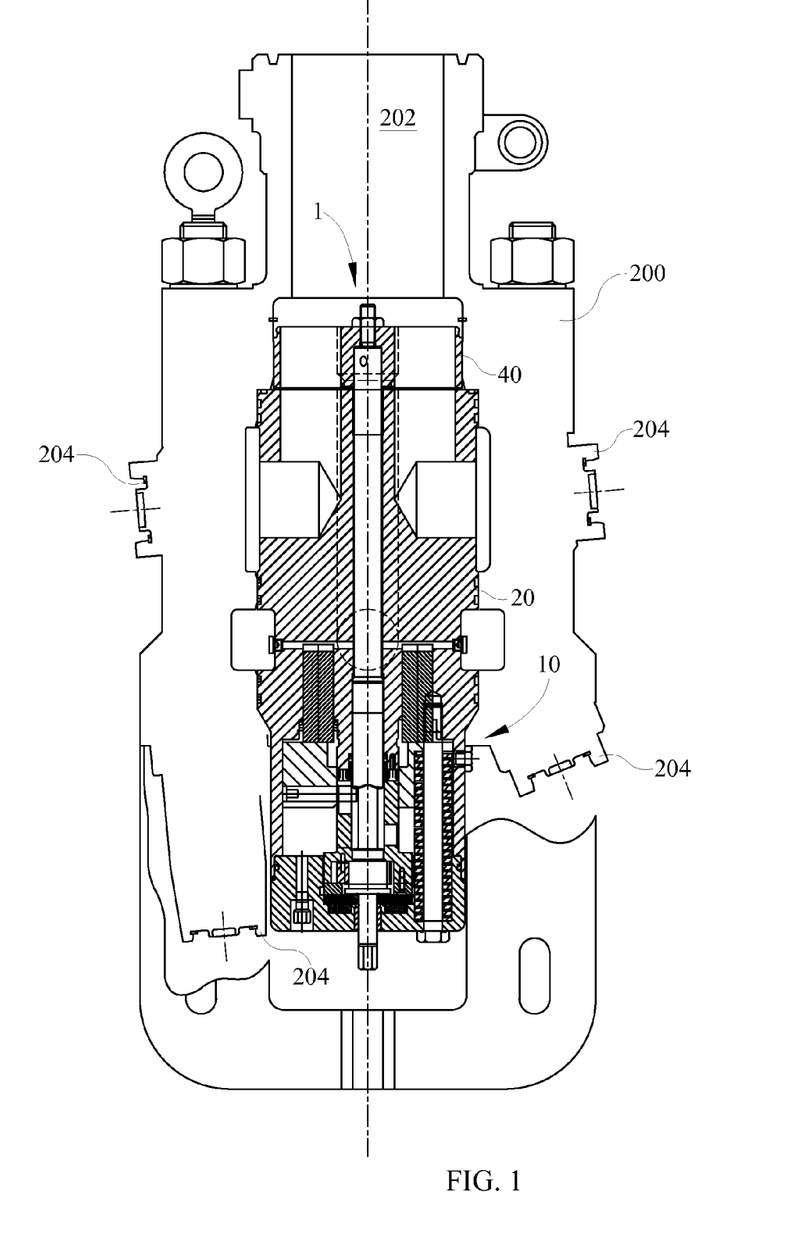
FIG. 1 schematically depicts a cutaway view of a decoking tool with a mode shifting apparatus according to one or more embodiments shown and described herein.

Referring generally to FIG. 1, a portion of a decoking tool 200 is schematically depicted. The decoking tool 200 can comprise a fluid delivery path 202 for supplying decoking fluid to one or more nozzles 204 via a mode-shifting apparatus 1. Accordingly, the mode-shifting apparatus 1 can be operated to selectively direct decoking fluid to any of the one or more nozzles 204 (e.g., sets of cutting nozzles or bore nozzles). Shifting mechanisms such as, for example, an Auto-Shift™ by Flowserve Corporation of Irving, Tex., USA, can be used to selectively direct the flow to the desired cutting nozzles, i.e., either the cutting nozzles or the drilling nozzles, depending on which part of the decoking operation the tool is in at that time. Specifically, decoking fluid can be pressurized and made to pass through one or more the nozzles 204 in response to one or the other of a drilling mode of operation or a cutting mode of operation. Details pertaining to nozzle and channel placement and operation can be seen in U.S. Pat. No. 6,644,567 that is owned by the Assignee of the present application and the pertinent portions of which are incorporated herein by reference.

Referring collectively to FIGS. 2A-4D, in one embodiment, the mode-shifting apparatus 1 can comprise axial channels 22 for the flow of decoking fluid to one of the nozzle sets. For example, the axial channels 22 can be diametrically opposed to one another about the axial dimension of a diversion body 20, while another set of channels (not shown) for the other of the nozzle sets can be diametrically opposed to one another. The axial channels 22 can terminate at an upper surface 24 of the diversion body 20. The biasing apparatus 10 can be formed into or mounted onto a lower portion of a diversion body 20 of mode-shifting apparatus 1. According to the embodiments described herein, the mode-shifting apparatus 1 can be outfitted with any number of passages for supplying pressurized fluid to any number of nozzles. The passages can be configured such that pressurized fluid traversing the upper surface 24 of the diversion body 20 can directed any subset of the one or more nozzles 204 (FIG. 1).

A control rod (also referred to herein as diversion plate shaft) 30 is a rotatable shaft that couples a diversion plate 40 that is perforate to the biasing apparatus 10 so that changes in pressure (i.e., depressurizations and repressurizations) applied to the biasing apparatus 10 can cause the diversion plate 40 to rotate. Rotations of the diversion plate 40 can be utilized to switch between the aforementioned drilling and cutting modes, i.e., by selectively providing pressurized fluid to the desired passage of the of a diversion body 20. Control rod 30 may be made from an upper and lower portion that are joined together, or may be fabricated as a single piece.

In one embodiment, the diversion plate 40 can define a generally cylindrical shape about its axis of rotation R, and can include paired axial passageways 42 that terminate in apertures at the upper surfaces 44 and lower surfaces 46 of the diversion plate 40. In this way, the diversion plate 40 acts like a valve between fluid delivery path 202 (FIG. 1) and the drilling and cutting nozzle sets. Upon the proper degree of rotation (for example, ninety degrees in a diversion plate 40 configured with two such axial passageways 42 and corresponding apertures), a flowpath can be formed with the channels that lead to one or the other of the drilling and cutting nozzle sets. Thus, depending up whether the mode-shifting apparatus 1 is supplying decoking fluid to a drilling mode or a cutting mode of operation, a pressurized source of decoking fluid that enters the top of diversion plate 40 is by the action of the biasing apparatus 10 routed to a corresponding set of drilling nozzles and cutting nozzles through axial passageways 42 and one or another set of channels.

Because of the decoking fluid pressures can be relatively high (e.g., thousands of pounds per square inch), a significant pressure differential can be formed across the portions of the diversion plate 40 that are used to block off the flow to the unused (and hence, relatively unpressurized) channels. Even though the biasing apparatus 10 can be designed to accomplish shifting during the depressurized stage of operation to reduce frictional forces between them, frictional contact may be present between the lower surface 46 of the diversion plate 40 and the adjacent upper surface 24 of diversion body 20 of the decoking tool 200 that defines the axial channels 22 therein. The various aspects of the present disclosure can be used to reduce these frictional forces by lifting the diversion plate 40 away from the upper surface 24 of the diversion body 20 during transient and/or preak pressure conditions (e.g., as the pressure applied to the diversion plate 40 changes from a relatively high state to a relatively low state, as the pressure applied to the diversion plate 40 changes from a relatively low state to a relatively high state, when the pressure applied to the diversion plate 40 is at a relatively high state, when the pressure applied to the diversion plate 40 changes is at a relatively low state to a relatively low state, or combinations thereof).

Figures 2A, 2B, 2C:
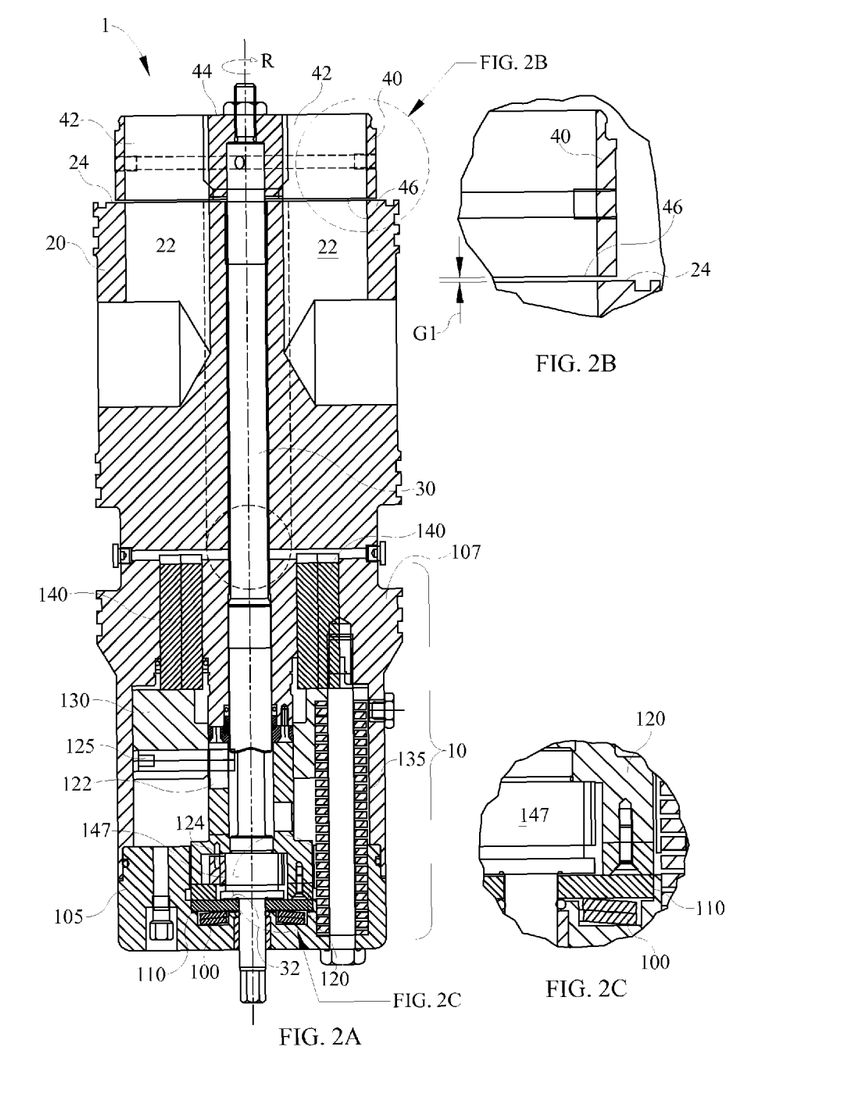
FIGS. 2A-2C schematically depicts the mode shifting apparatus of FIG. 1 in a depressurized state according to one or more embodiments shown and described herein.

Referring collectively to FIGS. 2A-2C, in one embodiment, the biasing apparatus 10 can comprise one or more axial springs 100 (e.g., a biasing member) situated between and in contact with respective surfaces of a lower cover plate 105 and a control rod sleeve 110. The one or more axial springs 100 can bias the diversion plate 40 in an unseated position relative to mode-shifting apparatus 1. For example, as is depicted in FIG. 2B, the diversion plate 40 can be biased to an unseated position such that an axial clearance or gap G1 is formed between the upper surface 24 of the diversion body 20 and the lower surface 46 of diversion plate 40. The gap G1 can be any distance sufficient to physically separate the diversion body 20 from the diversion plate 40, i.e., the gap G1 places the diversion body 20 out of contact with the diversion plate 40.

In order to place the diversion plate 40 in an unseated position with respect to the diversion body 20, the upper surface of the control rod sleeve 110 can be in axial contact with a lower surface of actuator sleeve 120 that defines a spiral groove 122 therein. An actuator pin 125 can be secured within an actuator pin carrier 130. Accordingly, the actuator sleeve 120 can be forced to rotate about an axis of rotation R as the actuator pin 125 moves axially up and down and traverses the spiral groove 122.

A ratchet mechanism 147 can interact with a pawl 124 that is coupled to the actuator sleeve 120 to selectively rotate the control rod 30. Specifically, the ratchet mechanism 147 and pawl 124 can ensures that the rotational force imparted to the actuator sleeve 120 by the actuator pin 125 is transmitted to the control rod 30 and the diversion plate 40 that is engaged with the control rod 30. Accordingly, the ratchet mechanism 147 can act as a positioning mechanism is cooperative with the control rod 30 to ensure precise clocking of the diversion plate 40 in the desired direction. For example, the diversion plate 40 can be clocked in ninety degree increments for a mode-shifting apparatus 1 with a pair of channels (such as axial channels 22 shown) for each of the drilling and cutting modes.

Moreover, the ratchet mechanism 147 can be configured to cause the actuator sleeve 120 to engage the control rod 30 to when the actuator sleeve rotates in one direction and to not engage the control rod 30 when the actuator sleeve rotates in another direction. Accordingly, the ratchet mechanism 147 can act to cause the control rod 30 to rotate during only one portion of the pressurization/depressurization cycle.

The biasing apparatus 10 may further comprise one or more shifting springs (also called shift biasing member) 135 that can be utilized to ensure that the actuator pin carrier 130 moves up when the pressure is reversed (rotating the actuator sleeve 120 in the opposite direction). In one embodiment, the one or more shifting springs 135 (e.g., a shift biasing member) engages the lower cover plate 105 and a piston 140. The piston 140 can be engaged with the actuator pin carrier 130 such that the piston 140 and the actuator pin carrier 130 move contemporaneously. The one or more shifting springs 135 can exert a force upon the piston 140 such that the piston 140 and the actuator pin carrier 130 are biased away from the lower cover plate 105.

According to the embodiments described herein, the diversion plate 40 can be transitioned to an unseated position to create gap G1 between the diversion plate 40 and the diversion body 20 prior to rotating the diversion plate 40. Specifically, a portion of the decoking fluid can be utilized to apply a force upon the piston 140 in opposition to the one or more shifting springs 135. When the pressurizing force supplied by the decoking fluid is greater than the force supplied by the one or more shifting springs 135, the one or more shifting springs 135 can be compressed. Conversely, when the pressurizing force supplied by the decoking fluid is less than the force supplied by the one or more shifting springs 135, the one or more shifting springs 135 can be decompressed. Accordingly, the motion of the piston 140 and, thus, the actuator sleeve 120 can be controlled by the pressure of the decoking fluid.

In addition to causing selective rotation of the control rod 30, the actuator sleeve 120 can be configured to apply force to the axial springs 100. In one embodiment, the control rod sleeve 110 can be in axial contact with the actuator sleeve 120. The axial springs 100 can be disposed between the lower cover plate 105 and the control rod sleeve 110. Accordingly, the axial springs 100 can be compressed between and exert force upon the lower cover plate 105 and the control rod sleeve 110.

The control rod 30 can be configured to interact with the control rod sleeve 110. In one embodiment, the control rod 30 can comprise a collar portion 32 that engages with the control rod sleeve 110. Accordingly, control rod 30 and the control rod sleeve 110 can move contemporaneously. Specifically, as force exerted upon the control rod sleeve 110 in opposition to the force exerted upon the control rod sleeve 110 by the axial springs 100, the axial springs 100 can be compressed and the control rod sleeve 110 can moved towards the lower cover plate 105. Conversely, as force exerted upon the control rod sleeve 110 in opposition to the force exerted upon the control rod sleeve 110 by the axial springs 100, the axial springs 100 can be uncompressed and the control rod sleeve 110 can moved away from the lower cover plate 105. In embodiments where the control rod 30 is engaged with the control rod sleeve 110, the axial position of the control rod 30 and thus, the gap G1 can be controlled by the axial position of the actuator sleeve 120.

As is noted above, the position of the actuator sleeve 120 can be controlled by the amount of pressure supplied by the decoking fluid. Moreover, in embodiments where the actuator sleeve 120 can engage the control rod sleeve 110, the axial position of the control rod 30 and the relative size of gap G1 can be controlled by the amount of pressure supplied by the decoking fluid.

For example, FIGS. 2A-2C depict the axial springs 100 in a relatively uncompressed state. Specifically, a relatively low amount of pressure is supplied to the piston 140. Thus, the spring force supplied by the shifting spring 135 is sufficient to maintain the piston 140 in a relatively high position, i.e., relatively close to the diversion body 20. Additionally, the actuator pin carrier 130 is at a relatively high position and no downward force is applied to the actuator sleeve 120 by the actuator pin carrier 130. Thus the axial springs 100 have sufficient spring force to urge the control rod sleeve 110 and the actuator sleeve 120 upwards towards the shift body 107. Moreover, the axial springs 100 have sufficient spring force, in the relatively uncompressed state, to urge the control rod 30 vertically form the gap G1 between the diversion plate 40 and the diversion body 20.

Figures 3A, 3B, 3C:
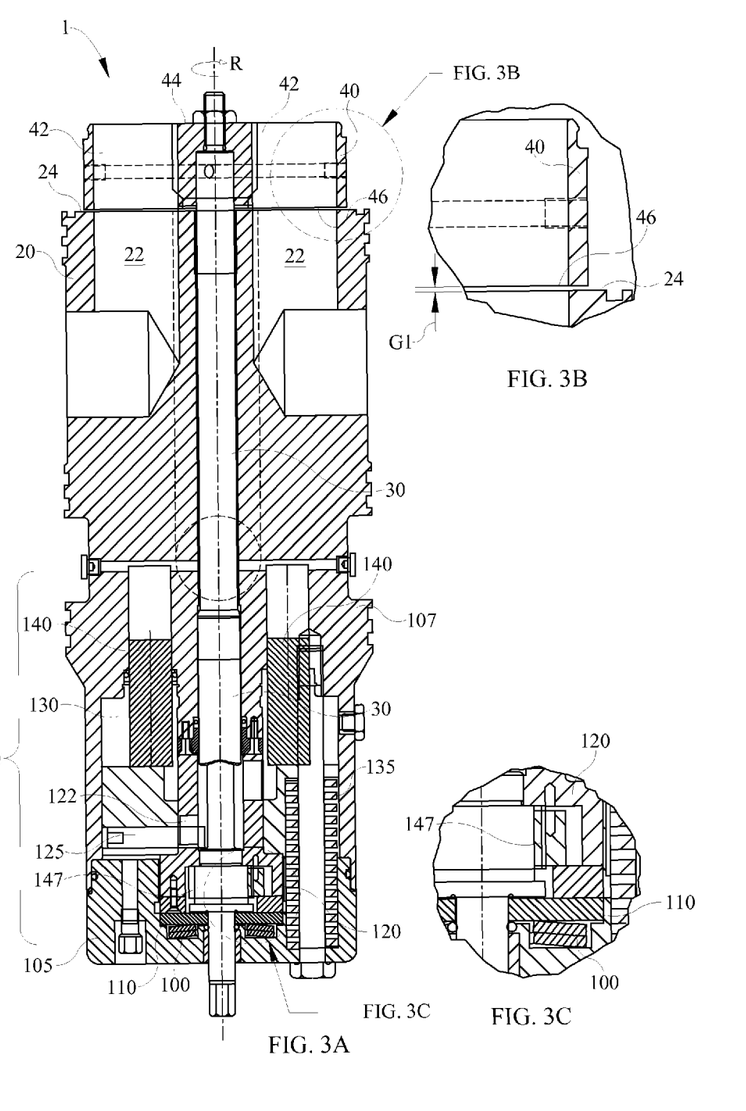
FIG. 3A-3C schematically depicts the mode shifting apparatus of FIG. 1 in a partially pressurized state according to one or more embodiments shown and described herein.

Referring next to FIGS. 3A-3C, the axial springs 100 are depicted in a relatively compressed state. The mode-shifting apparatus 1 can be transitioned from a state where the axial springs 100 are relatively uncompressed (FIGS. 2A-2C) to a state where the axial springs 100 are relatively compressed by increasing the pressure from the decoking fluid. Specifically, the piston 140 can be urged downward and push the actuator pin carrier 130 down while compressing the shifting spring 135. Such downward motion of the actuator pin carrier 130 can cause the actuator sleeve 120 to rotate under the influence of the actuator pin 125 interacting with the walls of the spiral groove 122 formed in the actuator sleeve 120. The control rod 30 can be rotated during this part of the pressurization cycle, i.e., as the pressure is increased. For example, the ratchet mechanism 147 can be configured to lock with the pawl 124 of the actuator sleeve 120 and cause the control rod 30 to rotate while gap G1 separates the diversion plate 40 and the diversion body 20. Accordingly, the ratchet mechanism 147 can be configured to cause the control rod to rotate with the actuator sleeve 120 an increase in pressure. In some embodiments, the spiral groove 122 formed in the actuator sleeve 120 can be configured to cause the diversion plate 40 to rotate in substantially equal increments such as, for example, in one embodiment about 90°.

While the one or more shifting springs 135 provide a strong bias against the actuator pin carrier 130 to maintain the actuator pin carrier 130 and actuator pin 125 at their topmost position, the one or more shifting springs 135 do not directly provide the lifting of the diversion plate 40 prior to and/or during the rotation that accompanies mode shifting. The axial springs 100 can supply sufficient spring force to form the gap G1 that separates the diversion plate 40 and the diversion body 20. Moreover, the pressure at which shifting occurs can be adjusted by varying the difference in spring constants of the one or more shifting springs 135 and the axial springs 100.

Overall, the effect of the axial springs 100 on lifting the diversion plate 40 before rotation, taken in conjunction with the automated shifting action of the mode-shifting apparatus 1, is such that friction associated with the rotational forces of the mode shifting are reduced. As such, wear that would otherwise happen when plates are in contact with one another under pressure is reduced. Furthermore, such reduced friction allows the relative rotation among the plates to be achieved with less power. The reduced friction can also facilitate more accurate rotations, which can be improved to accurate shifts within about 10° such as, for example, in one embodiment within about 5° or in another embodiment within about 2°.

Figure 4A:
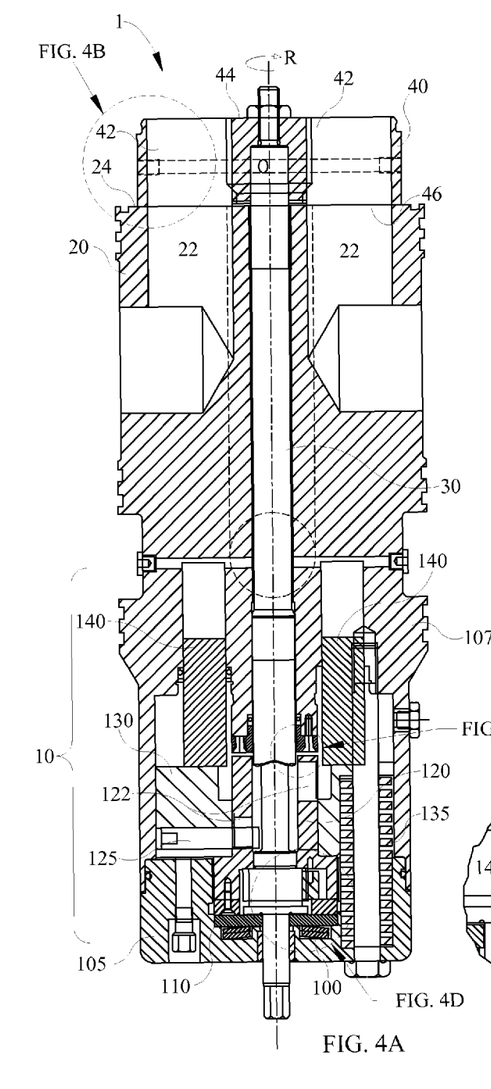
FIG. 4A-4D schematically depicts the mode shifting apparatus of FIG. 1 in a fully pressurized state according to one or more embodiments shown and described herein.
Figure 4B:
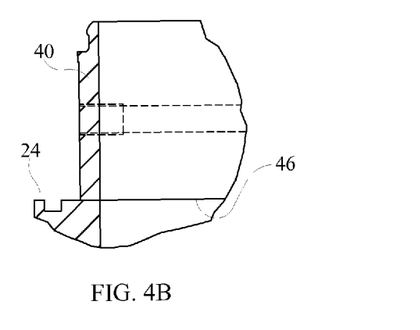
Figure 4C:
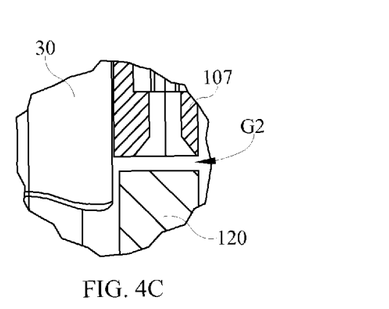
Figure 4D:
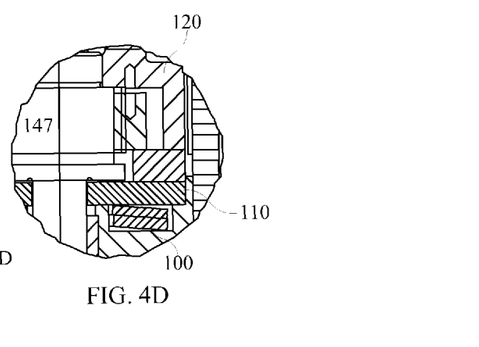

Referring next to FIGS. 4A-4D, still a further increase in pressure causes the piston 140 and actuator pin carrier 130 to apply increased pressure upon the actuator sleeve 120. The pressure may be increased to a pressure large enough to urge the actuator sleeve 120 downward towards the control rod 30 and the control rod sleeve 110. Accordingly, the axial springs 100 can be compressed, as is schematically depicted in FIG. 4D. As a result, the diversion plate 40 can be move downwards towards the diversion body 20. In one embodiment, the lower surface 46 of the diversion plate 40 and the upper surface 24 of the diversion body 20 can be urged into contact, as is schematically depicted in FIG. 4B. During this time, another gap G2 can be formed between the actuator sleeve 120 and the shift body 107, as is schematically depicted in FIG. 4C.

Referring again to FIGS. 3A-3C, when the pressure starts to decrease, the axial springs 100 can move the diversion plate 40 upwards to create gap G1 (FIG. 3B), while also removing gap G2 that was above the top of actuator sleeve 120 (FIG. 4C). Likewise, the piston 140, actuator pin carrier 130 and actuator sleeve 120 can be lifted by the axial springs 100.

Referring again to FIGS. 2A-2C, further decreases in pressure causes the shifting spring 135 to push the actuator pin carrier 130 and piston 140 upwards. This in turn causes the actuator sleeve 120 to rotate (under the cooperation of actuator pin 125 and spiral groove 122) in a direction opposite the rotation R. The ratchet mechanism 147 that is situated between the control rod 30 and the actuator sleeve 120 can allow the actuator sleeve 120 to rotate freely without engaging the control rod. Accordingly, the ratchet mechanism 147 can be configured to release the actuator sleeve 120 as the actuator sleeve 120 rotates during a decrease in pressure.

It is noted that, while the control rod 30 is described above as rotating during the increasing pressure portion of the pressure cycle and remaining stationary during the decreasing pressure portion of the pressure cycle, the control rod 30 may remain stationary during the increasing pressure portion of the pressure cycle and rotate during the decreasing pressure portion of the pressure cycle. For example, the rotational direction of the actuator sleeve 120 can be reversed or the direction of the ratchet mechanism 147 can be reversed. Accordingly, the diversion plate 40 can be unseated with respect to the diversion body 20, while shifting between modes (e.g., drilling and cutting modes) to reduce frictional forces and concomitantly extend the mean time between repair (MTBR) of decoking tool 200 and/or the mode-shifting apparatus 1.

Figure 5:
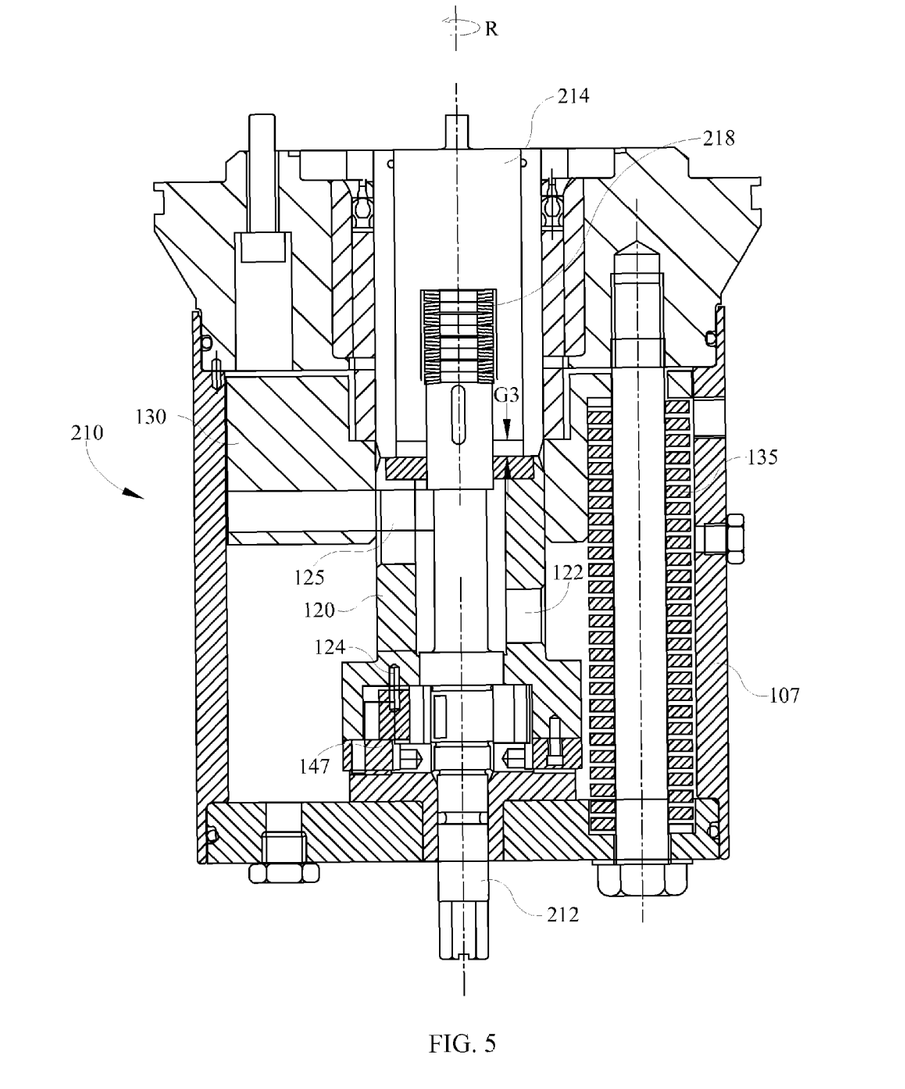
FIG. 5 schematically depicts a different embodiment of the mode shifting apparatus in a depressurized state according to one or more embodiments shown and described herein.

Referring now to FIG. 5, an alternative embodiment of the biasing apparatus 210 is schematically depicted. The biasing apparatus 210 can comprise a lower control rod 212 and an upper control rod 214 that are engaged with one another and operate in a manner analogous to the control rod 30 (FIGS. 2A-4D). Specifically, the lower control rod 212 can include a ratchet mechanism 147 that cooperates with a pawl 124 of the actuator sleeve 120, as is described herein above. The upper control rod 214 is engaged with the diversion plate 40 (not depicted in FIG. 5) such as via an extending rod. Accordingly, the diversion plate 40 can be configured to lift axially and rotate about the axis of rotation R by the upper control rod.

The biasing apparatus 210 can further comprise one or more axial springs 218 (e.g., biasing members) disposed between the lower control rod 212 and the upper control rod 214. The spring force supplied by axial springs 218 can be configured such that the upper control rod 214 can be lifted at decoking fluid pressures less than or equal to a predetermined pressure. The upper control rod 214 can be raised by a gap G3 over its lowermost position, which in turn causes gap G1 (FIG. 2B) to separate the diversion plate 40 from the diversion body 20 (FIG. 2A). Accordingly, the spring constant of the axial springs 218 can be set such that the gap G3 is formed at a predetermined pressure that is lower than the pressure needed to compress the shifting spring 135. Specifically, when the predetermined pressure can be set to any decoking fluid pressure that is less than the decoking fluid pressure required to move the piston 140 from its upper most position. Thus, the axial springs 218 can be configured such that gap G1 (FIG. 2B) exists prior to and during any rotational motion of the diversion plate 40 (FIG. 2A).

It should now be understood that the embodiments described herein can be utilized to improve shifting between cutting and drilling modes in a decoking tool used in oil refining coke drums. Axial springs may be employed in conjunction with a shift biasing member to allow frictional forces between adjacent surfaces of a flow diversion plate and the body of the decoking tool to be reduced/eliminated through the creation of slight axial gaps prior to any rotational movement between them. By allowing the mode shifting to take place while the diversion plate and the diversion body are separated, frictional forces that occur due to the relative rotary movement between the adjacent surfaces of the diversion plate and region of the tool around the drilling and cutting passageways can be reduced, thereby simplifying operation. Accordingly, wear can be reduced during mode shifting either during depressurization or pressurization to extend tool life. Additionally, benefits of the embodiments described herein include smoother shifting, more compact arrangement, shifting at high pressures, reduced operation time and increased reliability.

Accordingly, the embodiments described herein (including axial springs 100) can allow the mode-shifting apparatus 1 to complete shifting at higher residual pressures. This in turn allows completion of the shifting in less time, and more particularly means that the decoking tool valve (DCV) will only have to go to a "prefill" position rather than to a "bypass" position, and that in so doing can increase the life of the DCV.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A mode-shifting apparatus in a fluid jet decoking tool, said apparatus comprising:
   a diversion plate configured to provide selective fluid communication between a source of pressurized decoking fluid and a first nozzle and a second nozzle;
   a control rod coupled to said diversion plate;
   a shifting mechanism comprising an actuator sleeve cooperative with said diversion plate through said control rod such that a change in decoking fluid pressure imparted to said apparatus produces selective rotary movement in said diversion plate; and
   a biasing member comprising a first axially-biased spring and a second axially-biased spring that are each responsive to changes of said decoking fluid pressure such that said first spring maintains said diversion plate and said decoking tool in a state of axial separation during at least a portion of time that corresponds to an increase in pressure in said source of pressurized decoking fluid present at said diversion plate, while said second spring cooperates with said control rod and said shifting mechanism to rotate said diversion plate during said increase in pressure.

2. The apparatus of claim 1, wherein said control rod rotates around an axis of rotation and said second spring of said biasing member is aligned along said axis of rotation.

3. The apparatus of claim 1, wherein said first spring is in a relatively uncompressed state when said diversion plate is unseated and in a relatively compressed state when said diversion plate is seated.

4. The apparatus of claim 1, wherein said actuator sleeve is aligned with said axis of rotation, wherein said actuator sleeve constrains movement of said control rod along said axis of rotation.

5. The apparatus of claim 4, wherein said actuator sleeve rotates around said axis of rotation and slides along said axis of rotation.

6. The apparatus of claim 5, further comprising an actuator pin carrier engaged with the actuator sleeve and biased axially by said second spring.

7. The apparatus of claim 6, wherein said second spring defines at least one shifting spring with a spring constant that is different from a spring constant of said first spring.

8. The apparatus of claim 4, further comprising a control rod sleeve disposed between said first spring of said biasing member, wherein said control rod sleeve is in axial contact with said actuator sleeve.

9. The apparatus of claim 8, wherein said control rod comprises a collar portion that engages with the control rod sleeve, and said control rod and said control rod sleeve move contemporaneously.

10. The apparatus of claim 1, wherein said control rod comprises an upper portion and a lower portion that are joined together.

11. The apparatus of claim 1, wherein said control rod is fabricated as a single piece.

12. The apparatus of claim 1, wherein said unseating comprises an axial separation distance sufficient to avoid friction between said diversion plate and said adjacent surface of said decoking tool.

13. A mode-shifting apparatus in a fluid jet decoking tool, said apparatus comprising:
- a diversion plate configured to provide selective fluid communication between a source of pressurized decoking fluid and a first nozzle and a second nozzle;
- a control rod coupled to said diversion plate, wherein said control rod comprises a ratcheting mechanism;
- a shifting mechanism comprising an actuator sleeve engaged with said ratcheting mechanism of said control rod, wherein said actuator sleeve is engaged with an actuator pin carrier and an axially-biased shifting spring, and wherein a change in decoking fluid pressure imparted to said apparatus produces selective rotary movement in said diversion plate; and
- an axially-biased lifting spring responsive to changes of said decoking fluid pressure and cooperative with said shifting spring such that said lifting spring maintains said diversion plate and said decoking tool in a state of axial separation during at least a portion of time that corresponds to an increase in pressure in said source of pressurized decoking fluid present at said diversion plate, while said shifting spring cooperates with said control rod and said shifting mechanism to rotate said diversion plate during said increase in pressure.

14. The apparatus of claim 1, wherein cooperation between said first spring and said diversion plate is substantially translational and cooperation between said second spring and said diversion plate is substantially rotational.

15. The apparatus of claim 13, wherein cooperation between said first spring and said diversion plate is substantially translational and cooperation between said second spring and said diversion plate is substantially rotational.

* * * * *

UNITED STATES PATENT AND TRADEMARK OFFICE
CERTIFICATE OF CORRECTION

PATENT NO. : 9,175,225 B2
APPLICATION NO. : 13/367706
DATED : November 3, 2015
INVENTOR(S) : Daniel O. Arzuaga et al.

It is certified that error appears in the above-identified patent and that said Letters Patent is hereby corrected as shown below:

In the specification

Col. 3, Line 12,
"and made to pass through one or more the nozzles 204 in" should read
--and made to pass through one or more of the nozzles 204 in--;

Col. 3, Line 34-35,
"versing the upper surface 24 of the diversion body 20 can directed any subset of the one or more nozzles 204 (FIG. 1)." should read
--versing the upper surface 24 of the diversion body 20 can be directed to any subset of the one or more nozzles 204 (FIG. 1).--;

Col. 3, Line 38,
"that is perforate to the biasing apparatus 10 so that changes in" should read
--that is perforated to the biasing apparatus 10 so that changes in--;

Col. 3, Line 44,
"to the desired passage of the of a diversion body 20. Control" should read
--to the desired passage of a diversion body 20. Control--;

Col. 3, Line 58,
"nozzle sets. Thus, depending up whether the mode-shifting" should read
--nozzle sets. Thus, depending upon whether the mode-shifting--;

Col. 3, Line 65,
"Because of the decoking fluid pressures can be relatively" should read
--Because the decoking fluid pressures can be relatively--;

Signed and Sealed this
Fifth Day of July, 2016

Michelle K. Lee
*Director of the United States Patent and Trademark Office*

CERTIFICATE OF CORRECTION (continued)
U.S. Pat. No. 9,175,225 B2

In the specification

Col. 4, Line 12,
"20 during transient and/or preak pressure conditions (e.g., as" should read
--20 during transient and/or peak pressure conditions (e.g., as--;

Col. 4, Line 16-19,
"state to a relatively high state, when the pressure applied to the diversion plate 40 is at a relatively high state, when the pressure applied to the diversion plate 40 changes is at a relatively low state to a relatively low state, or combinations thereof)." should read
--state to a relatively high state, when the pressure applied to the diversion plate 40 is at a relatively high state, when the pressure applied to the diversion plate 40 is at a relatively low state, or combinations thereof).--;

Col. 4, Line 47,
"pawl 124 can ensures that the rotational force imparted to the" should read
--pawl 124 can ensure that the rotational force imparted to the--;

Col. 4, Line 51,
"147 can act as a positioning mechanism is cooperative with" should read
--147 can act as a positioning mechanism and is cooperative with--;

Col. 5, Line 43,
"control rod sleeve 110 can moved towards the lower cover" should read
--control rod sleeve 110 can be moved towards the lower cover--;

Col. 6, Line 5,
"in the relatively uncompressed state, to urge the control rod 30" should read
--in the relatively uncompressed state, to urge the control rod 30 to--; and Col. 6, Line 28,
"actuator sleeve 120 an increase in pressure. In some embodi-" should read
--actuator sleeve 120 and increase in pressure. In some embodi- --.